United States Patent [19]

Gross et al.

[11] 4,233,379

[45] Nov. 11, 1980

[54] SEPARATOR FOR STARVED ELECTROLYTE LEAD/ACID BATTERY

[75] Inventors: Stephen E. Gross; Clifford W. Cain, Jr., both of Littleton; Paul D. Bilawsky, Lakewood; Norman B. Scheffel, Parker, all of Colo.

[73] Assignee: Johns-Manville Corporation, Denver, Colo.

[21] Appl. No.: 39,708

[22] Filed: May 17, 1979

Related U.S. Application Data

[63] Continuation-in-part of Ser. No. 19,805, Mar. 12, 1979, abandoned.

[51] Int. Cl.$^3$ .............................................. H01M 2/16
[52] U.S. Cl. ..................................... 429/247; 106/52; 252/378 P; 252/449
[58] Field of Search ............. 429/247; 106/DIG. 2, 52; 252/449, 378 P

[56] References Cited

U.S. PATENT DOCUMENTS

| | | | |
|---|---|---|---|
| 2,634,208 | 4/1953 | Miscall et al. | 106/DIG. 2 |
| 3,010,835 | 11/1961 | Charles et al. | 106/DIG. 2 |
| 3,085,126 | 4/1963 | Labino | 429/247 |
| 3,862,861 | 1/1975 | McClelland et al. | 429/57 |
| 4,150,199 | 4/1979 | Tuphorn et al. | 429/247 X |

*Primary Examiner*—Anthony Skapars
*Attorney, Agent, or Firm*—Robert M. Krone; Joseph J. Kelly; James W. McClain

[57] ABSTRACT

Compositions and papers made therefrom useful as separator materials in starved electrolyte lead/acid batteries are described. The compositions comprise a mixture of 30% to 80% by weight of perlite and 20% to 70% by weight of glass fibers. The glass fibers have diameters in the range of from 0.3 to 1.0 micrometers while the perlite has particle sizes in the range of from about 3 to about 100 micrometers.

12 Claims, No Drawings

SEPARATOR FOR STARVED ELECTROLYTE LEAD/ACID BATTERY

This application is a continuation-in-part of application Ser. No. 019,805, filed Mar. 12, 1979, now abandoned.

TECHNICAL FIELD

The invention herein relates to lead/acid electric storage batteries. More particularly it relates to separators for such batteries.

BACKGROUND OF THE PRIOR ART

Recently efficient maintenance-free rechargeable sealed lead/acid storage batteries utilizing a "starved electrolyte" concept have been introduced commercially. Various aspects of batteries of this type are disclosed in a number of patents, most notably U.S. Pat. No. 3,862,861. Such batteries normally utilize as separators materials such as microporous rubber, polyvinyl chloride, polyolefins, phenolic resin impregnated paper or (preferably) glass paper made from microfiber diameter, unwoven, short staple glass fibers. These batteries, while useful in a wide variety of applications, have been severely limited in the practical sizes which can be commercially utilized because of the high cost of these batteries per unit of energy density. Thus, while cells of the common C, D, "beer can" and similar sizes are practical for some purposes commercially, larger sizes such as the typical automotive battery size are far too costly for commercial practicality. Similarly, the high unit density cost of even the smaller size batteries have restricted these types of batteries to high value end uses such as in spacecraft and emergency equipment, effectively eliminating the batteries from the fields of conventional consumer use such as flashlights, radios and the like.

In these types of batteries a very high proportion of the cost of battery materials lies in the cost of the separator. The preferred microfiber glass paper separators are extremely costly. In the past, however, all attempts to substitute lower cost materials have led to battery structures with significantly poorer electrical characteristics.

It would therefore be highly desirable to have a separator material (as defined herein) suitable for use in batteries of the type described which will provide equivalent or superior electrical characteristics as compared to the present high cost materials, but which would utilize materials having a markedly lower cost than the present materials, thus making the batteries economically feasible for use in a much wider range of applications, particularly including the automotive ("SLI") battery market.

BRIEF SUMMARY OF THE INVENTION

The invention herein includes a separator composition for use in a starved electrolyte lead/acid battery which comprises a mixture of 30% to 80% by weight of expanded perlite and 20% to 70% by weight of glass fiber, wherein the glass fibers have diameters in the range of from about 0.3 to about 1.0 micrometers and the perlite has particle sizes in the range of from about 3 to about 100 micrometers. These compositions have been found to be essentially equivalent in all important physical, chemical and electrical properties to the microporous glass papers but are of approximately only half the cost. The invention also includes a paper article made from this composition and a battery separator made from the paper.

DETAILED DESCRIPTION OF THE INVENTION

The articles utilizing the compositions of this invention are denominated "separators" for the starved electrolyte lead/acid batteries, following the nomenclature of the prior patents, especially the aforesaid U.S. Pat. No. 3,862,861. However, it will be recognized from the structure of these starved electrolyte batteries that the articles, unlike separators in conventional batteries, are multifunctional, in that they possess not only a separator function but also a reservoir function, wherein they serve to retain the electrolyte within the battery. It is believed that the microporous nature and the high specific surface area of the present articles, with their myriads of minute passageways and interstices, impart to the articles their ability to combine these different functions. For the purposes of this specification, therefore, the practice of the aforesaid prior patents in labeling these articles "separators" will be adhered to, but the difference between the present multifunctional articles (with their "separator/reservoir" nature) and conventional battery separators should be recognized.

The compositions herein are formed from a mixture of expanded perlite granules and small diameter glass fibers.

Perlite is a rhyolitic glassy rock formed by volcanic action. Perlite is unique among the glassy materials in that it contains a significant proportion of combined water which, when the perlite is crushed and rapidly heated, is converted to steam and causes the perlite granules to expand or "pop" to form expanded perlite granules with volumes some 4 to 20 times greater than the volume of the original unexpanded particles. Bulk densities of the expanded materials are commonly in the range of from about 0.03 to about 0.25 g/cm$^3$. The high volume low bulk density expanded perlite has in the past been used in a variety of applications, including as filter aids, thermal insulation, lightweight concrete aggregates and for horticultural use. However, expanded perlite has never before been considered as having utility in electric batteries.

In the compositions of this invention the perlite will be present in the form of generally irregular particles having nominal particle sizes in the range of from about 3 to about 100 micrometers. Most suitable for use in the present invention are those grades of perlite having particle sizes in the range of from about 10 to about 35 micrometers. Suitable grades of perlite are available commercially from Johns-Manville Corporation. The perlite will be present in the composition as from about 30% to about 80%, preferably 50% to 70%, of the composition. (Unless otherwise stated, all percentages herein are by weight.)

Since perlite is a natural material, the compositions of batches taken from different ore bodies or even different parts of the same ore body will normally vary, sometimes widely, but normally within fairly well defined limits. Typical perlite chemical analyses show 71% to 75% $SiO_2$, 12% to 18% $Al_2O_3$, 7% to 9% $K_2O$ and $Na_2O$ with the remainder being a wide variety of other oxides and elements including materials such as calcium, iron, magnesium and titanium oxides. Typical analyses are described in *Industrial Minerals,* page 17 (May, 1977). The exact composition of the perlite is not critical in this invention, as long as the perlite used is chemically and electrically compatible with the other materials in the present separator compositions and also in the assembled batteries.

The glass fibers used in the present compositions may be any of a wide variety of glass fiber forming compositions. The fibers formed from such compositions must have average volume surface diameters in the range of from 0.3 to 1.0 micrometers. Typical glass compositions for glass fibers useful in this invention include those shown in U.S. Pat. No. 3,085,887. The glass fibers will be present in the composition as from about 20% to about 70%, preferably 30% to 50%, of the composition. Compositions containing less than about 20% of glass fiber do not produce papers with adequate physical integrity to withstand handling, while those with more than about 70% glass fiber give no added electrical properties but are significantly costlier.

The separator articles of the present invention may also contain small amounts (up to a few percent by weight) of other materials such as unexpanded perlite, glass fragments, silica particles and the like. Because the nature of the separator is vitally important to the electrical performance of the finished battery, however, such materials should be present only if they do not detrimentally affect that electrical performance. Since the effect on electrical performance of the various types of potential impurities cannot be readily determined, it is preferred that the amount of impurities be minimized and the compositions herein be composed essentially entirely of the expanded perlite and glass fiber.

The compositions of the present invention are formed into sheets of paper, from which the separator materials of the present invention are made, in the manner of conventional paper making. The glass fibers and expanded perlite are dispersed in a water slurry which is stirred so as to cause the perlite and glass fibers to become thoroughly and randomly mixed with each other. The perlite/fiber mixture is then deposited from the water slurry onto a conventional paper making screen or wire as in a Fourdrinier machine or a Rotoformer machine to form a matted paper. For these purposes the perlite in the furnish should not contain more than about 5%, perferably not more than about 1%, of "floaters," which are perlite particles which float on the surface of the water slurry. Floaters are detrimental because they do not get incorporated into the fiber matrix of the paper, but are deposited last as the slurry drains and thus form a loose dusty layer on the surface of the paper. Quantities of floaters greater than those mentioned above merely increase the problem. The paper formed of the fibers and perlite particles is then dried and collected in a conventional manner, following which the quantites of paper may be cut to sizes appropriate for the various size batteries in which the separator materials are to be used.

STATEMENT OF INDUSTRIAL APPLICATION

The materials of the present invention find application as separators and reservoirs in starved electrolyte lead/acid storage batteries. Batteries using such materials will in turn find application for many electrical power generating uses including automotive electrical systems.

We claim:

1. A composition, useful as a separator material in starved electrolyte lead/acid batteries, which comprises a mixture of 30% to 80% by weight of expanded perlite and 20% to 70% by weight of glass fiber, said glass fibers having diameters in the range of from about 0.3 to about 1.0 micrometers and said perlite having particle sizes in the range of from about 3 to about 100 micrometers.

2. A composition as in claim 1 consisting essentially of said expanded perlite and said glass fibers.

3. A composition as in claims 1 or 2 wherein said expanded perlite is present as from 50% to 70% by weight of the composition and said glass fiber is present as from 30% to 50% by weight of the composition.

4. A composition as in claims 1 or 2 wherein said expanded perlite has particle sizes in the range of from about 10 to about 35 micrometers.

5. A paper useful as separator material in a starved electrolyte lead/acid battery comprising the composition of claim 1 in matted form.

6. A paper useful as separator material in a starved electrolyte lead/acid battery comprising the composition of claim 2 in matted form.

7. A paper useful as separator material in a starved electrolyte lead/acid battery comprising the composition of claim 3 in matted form.

8. A paper useful as separator material in a starved electrolyte lead/acid battery comprising the composition of claim 4 in matted form.

9. A battery separator for a starved electrolyte lead/acid battery formed from a paper as in claim 5.

10. A battery separator for a starved electrolyte lead/acid battery formed from a paper as in claim 6.

11. A battery separator for a starved electrolyte lead/acid battery formed from a paper as in claim 7.

12. A battery separator for a starved electrolyte lead/acid battery formed from a paper as in claim 8.

* * * * *